(12) United States Patent
Damsaz et al.

(10) Patent No.: US 10,878,701 B2
(45) Date of Patent: Dec. 29, 2020

(54) DETECTION OF ATTACKS ON VEHICLE NETWORKS

(71) Applicant: Ford Global Technologies, LLC, Dearborn, MI (US)

(72) Inventors: Mahrdad Damsaz, Dexter, MI (US); Mostafa Parchami, Dearborn, MI (US); Krithika Swaminathan, Dearborn, MI (US); Hamed Babazadehrokni, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 168 days.

(21) Appl. No.: 16/155,343

(22) Filed: Oct. 9, 2018

(65) Prior Publication Data

US 2020/0111364 A1   Apr. 9, 2020

(51) Int. Cl.
| | | |
|---|---|---|
| *G06G 1/16* | (2006.01) |
| *G06K 9/62* | (2006.01) |
| *G06K 9/00* | (2006.01) |
| *G01S 7/00* | (2006.01) |
| *G08G 1/015* | (2006.01) |
| *G08G 1/01* | (2006.01) |
| *G08G 1/04* | (2006.01) |
| *G08G 1/0962* | (2006.01) |
| *G08G 1/16* | (2006.01) |
| *G01S 17/931* | (2020.01) |

(52) U.S. Cl.
CPC .............. *G08G 1/166* (2013.01); *G01S 7/003* (2013.01); *G06K 9/00805* (2013.01); *G06K 9/6268* (2013.01); *G06K 9/6292* (2013.01); *G08G 1/015* (2013.01); *G08G 1/0116* (2013.01); *G08G 1/04* (2013.01); *G08G 1/0962* (2013.01); *G08G 1/163* (2013.01); *G08G 1/164* (2013.01); *G01S 17/931* (2020.01)

(58) Field of Classification Search
CPC ........ G08G 1/166; G08G 1/163; G08G 1/015; G08G 1/0116; G08G 1/04; G08G 1/0962; G08G 1/164; G06K 9/6268; G06K 9/6292; G06K 9/00805; G01S 7/003; G01S 17/931; G01S 7/4802; G01S 7/497; G01S 2013/9316
See application file for complete search history.

(56) References Cited

U.S. PATENT DOCUMENTS

| | | |
|---|---|---|
| 9,671,785 B1 | 6/2017 | Bhatia et al. |
| 9,990,844 B2 | 6/2018 | Park et al. |
| 2016/0284212 A1 | 9/2016 | Tatourian et al. |
| 2017/0032671 A1 | 2/2017 | Toyama et al. |
| 2017/0230385 A1 | 8/2017 | Ruvio et al. |
| 2019/0114921 A1* | 4/2019 | Cazzoli ............... H04W 4/029 |
| 2019/0316913 A1* | 10/2019 | Golov ................. G01C 21/30 |
| 2019/0333379 A1* | 10/2019 | Malkes ............. G06K 9/00825 |

FOREIGN PATENT DOCUMENTS

WO   2017180382 A1   10/2017

* cited by examiner

*Primary Examiner* — Anne Marie Antonucci
(74) *Attorney, Agent, or Firm* — Frank A. MacKenzie; Bejin Bieneman PLC

(57) ABSTRACT

A computer includes a processor and a memory. The memory stores instructions executable by the processor to receive respective object data including an object location from each of three or more vehicles, based on determining an inconsistency of the object data received from a first vehicle with respect to respective object data of the other vehicles, perform an action.

20 Claims, 8 Drawing Sheets

DETECTION OF ATTACKS ON VEHICLE NETWORKS

BACKGROUND

A vehicle such as an autonomous or semi-autonomous vehicle can use data from one or more sensor(s), such as a LIDAR (Light Imaging Detection And Ranging) sensor, to aid navigation. LIDAR sensors can provide data that describes objects, e.g., a collection of data describing points in three dimensions. However, if LIDAR data is inaccurate or incomplete, then safe operation of the vehicle may be impaired or prevented.

DETAILED DESCRIPTION

Introduction

Figure 1:
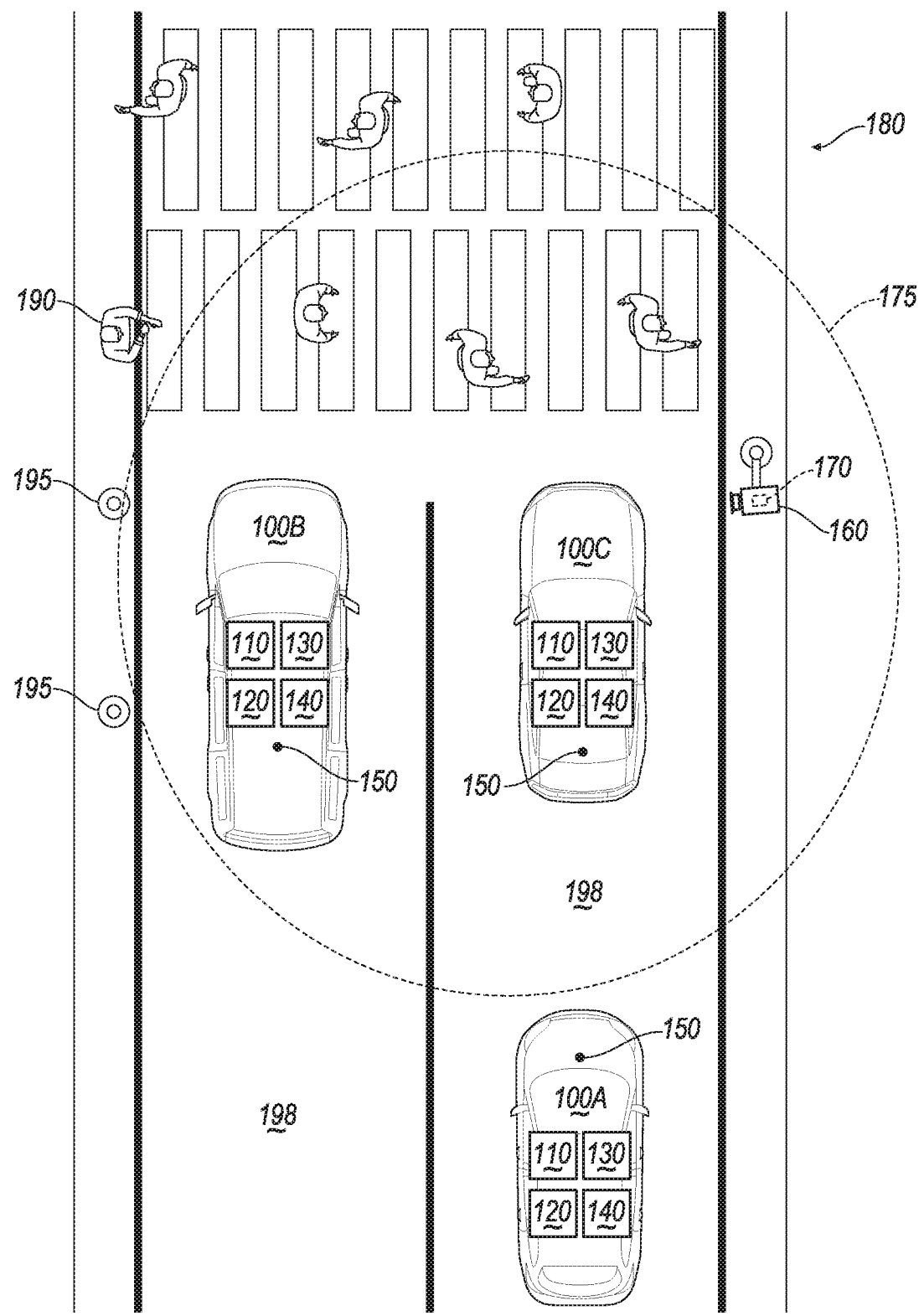
FIG. 1 is a block diagram showing an example sensor directed toward an example road section.

Disclosed herein is a computer including a processor and a memory. The memory stores instructions executable by the processor to receive respective object data including an object location from each of three or more vehicles, and based on determining an inconsistency of the object data received from a first vehicle with respect to respective object data of the other vehicles, perform an action.

The object data in addition to the object location may further include at least one of an object orientation, object dimensions, a sensor identifier, and a time stamp.

The inconsistency may include a failure to detect an object, detection of an object not included in the object data of the other vehicles, or an object misclassification.

The object data may further include an object classifier including at least one of a car, a truck, a pedestrian, and a bicycle, and an object misclassification inconsistency may include an incorrect object classifier included in object data.

The object data may further include a motion status specifying at least one of a moving object and a stationary object.

The object location in the first vehicle's object data may be a location of the first vehicle.

The instructions may further include instructions to, based on determining that a second object occludes the object from a field of view of a first vehicle sensor, ignore the object in determining the inconsistency of the object data of the first vehicle.

The instructions may further include instructions to determine, based on object data received from a second sensor, that the second object occludes the object from the field of view of the first vehicle sensor, wherein the second sensor is at least one of a sensor of a second vehicle and a stationary sensor mounted to an infrastructure component.

The instructions to perform the action may further include actuating a second vehicle computer to at least one of (i) ignoring the object data received from the first vehicle, (ii) actuating the first vehicle to stop, and (iii) outputting a message in an area within a predetermined distance of the first vehicle.

The instructions may further include instructions to determine the inconsistency of the object data of the first vehicle further based on determining that the object is within a detection range of the first vehicle.

Further disclosed herein is a method including receiving respective object data including an object location from each of three or more vehicles, and based on determining an inconsistency of the object data received from a first vehicle with respect to respective object data of the other vehicles, performing an action.

The object data in addition to the object location may further include at least one of an object orientation, object dimensions, a sensor identifier, and a time stamp.

The inconsistency may include a failure to detect an object, detection of an object not included in the object data of the other vehicles, or an object misclassification.

The object data may further include an object classifier including at least one of a car, a truck, a pedestrian, and a bicycle, and an object misclassification inconsistency may include an incorrect object classifier included in object data.

The object data may further include a motion status specifying at least one of a moving object and a stationary object.

The object location in the first vehicle's object data may be a location of the first vehicle.

The method may further include, based on determining that a second object occludes the object from a field of view of a first vehicle sensor, ignoring the object in determining the inconsistency of the object data of the first vehicle.

The method may further include determining, based on object data received from a second sensor, that the second object occludes the object from the field of view of the first vehicle sensor, wherein the second sensor is at least one of a sensor of a second vehicle and a stationary sensor mounted to an infrastructure component.

Performing the action may further include actuating a second vehicle computer to at least one of (i) ignoring the object data received from the first vehicle, (ii) actuating the first vehicle to stop, and (iii) outputting a message in an area within a predetermined distance of the first vehicle.

The method may further include determining the inconsistency of the object data of the first vehicle further based on determining that the object is within a detection range of the first vehicle.

Further disclosed is a computing device programmed to execute any of the above method steps.

Yet further disclosed is a computer program product, comprising a computer readable medium storing instructions executable by a computer processor, to execute any of the above method steps.

System Elements

A host vehicle computer and/or sensor may be a target of a cyber-attack, e.g., an intruder computer may manipulate or spoof vehicle sensor data such as location data, object data, etc. The vehicle consequently may plan a path, collision avoidance actions, etc., based on incorrect and/or incomplete data, thereby impairing vehicle operation. Further, via vehicle-to-vehicle communication (V2V), the host vehicle can provide to one or more other vehicles the data altered by cyber-attack, thereby impairing or jeopardizing operation of the other vehicle(s). Herein to address the problem of cyber-attacks comprising vehicle sensor data and/or data provided via V2V communications, a computer, e.g., an infrastructure computer, may be programmed to receive respective object data including an object location from each of three or more vehicles, and based on determining an inconsistency of the object data received from a first vehicle with respective object data of the other vehicles, perform an action, e.g., actuate other vehicle(s) to ignore the object data of the first vehicle, take action to stop the first vehicle, etc. In this disclosure, a vehicle with inconsistent object data may be referred to as an aberrant or suspicious vehicle.

FIG. 1 illustrates a top view image of an example geographical area 180, including vehicles 100A, 100B, 100C operating within the area 180, e.g., on a road 198. A stationary sensor 160 is mounted at a side of the road 198, and includes within its field of view objects within the area 180 such as pedestrians 190, and non-moving (or stationary) objects 195, e.g., a traffic sign, cone, etc., and/or moving objects such as vehicles 100A, 100B, 100C. A geographic area 180 (or area 180) in the present context means a two-dimensional (2D) area on the surface of the earth. Boundaries or edges of an area 180 may be defined by global positioning system (GPS) coordinates, e.g., as vertices of a triangular or rectangular area 180, a center of a circular area 180, etc. An area 180 may have any dimensions and/or shape, e.g., rectangular, oval, circular, non-geometrical shape, etc. As discussed below, an area 180 may include a section of a road, an intersection, etc. An area 180 may be defined based on a detection range 175 of the sensor 160, i.e., locations within a predetermined distance from the stationary sensor 160. In another example, an area 180 may include locations within a detection range of a vehicle 100A sensor 130. The detection range 175, in the present context, is a distance, e.g., 200 meters, within a field of view of the sensor 130, 160.

A vehicle 100A, 100B, 100C may be a land vehicle with two or more wheels, and is typically machine-powered, e.g., with an electric motor and/or internal combustion engine. The vehicle 100A, 100B, 100C may include a computer 110, actuator(s) 120, sensor(s) 130, and/or a human machine interface (HMI 140). A vehicle 100A, 100B, 100C may include a reference point 150, e.g., an intersection of a vehicle 100 longitudinal and lateral axes (the axes can define respective longitudinal and lateral center lines of the vehicle 100 so that the reference point 150 may be referred to as a vehicle 100 center point). In the present context, a vehicle 100 location refers to sensed object coordinates of the vehicle 100 reference point 150, as discussed with reference to FIGS. 4A-4B.

The computer 110 includes a processor and a memory. The memory includes one or more forms of computer-readable media, and stores instructions executable by the computer 110 for performing various operations, including as disclosed herein.

The computer 110 may operate the vehicle 100A, 100B, 100C in an autonomous, semi-autonomous, or non-autonomous mode. For purposes of this disclosure, an autonomous mode is defined as one in which each of vehicle 100A, 100B, 100C propulsion, braking, and steering are controlled by the computer 110; in a semi-autonomous mode the computer 110 controls one or two of vehicle 100A, 100B, 100C propulsion, braking, and steering; in a non-autonomous mode, a human operator controls vehicle propulsion, braking, and steering, e.g., via the HMI 140.

The computer 110 may include programming to operate one or more of vehicle brakes, propulsion (e.g., control of acceleration in the vehicle 100A, 100B, 100C by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may include or be communicatively coupled to, e.g., via a vehicle communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network such as a bus in the vehicle such as a controller area network (CAN) or the like.

Via the vehicle network, the computer 110 may transmit messages to various devices in the vehicle 100A, 100B, 100C and/or receive messages from the various devices, e.g., the LIDAR sensor 130, actuators 120, etc. Alternatively or additionally, in cases where the computer 110 actually comprises multiple devices, the vehicle communication network may be used for communications between devices represented as the computer 110 in this disclosure. Further, as mentioned below, various controllers and/or sensors 130 may provide data to the computer 110 via the vehicle 100A, 100B, 100C communication network.

The vehicle 100A, 100B, 100C actuators 120 may be implemented via circuits, chips, or other electronic components that can actuate various vehicle subsystems in accordance with appropriate control signals as is known. The actuators 120 may be used to control braking, acceleration, and steering of the vehicle 100A, 100B, 100C. As an example, the vehicle 100A, 100B, 100C computer 110 may output control instructions to control the actuators 120.

The vehicle 100A, 100B, 100C may include one or more LIDAR sensor(s) +, providing data about at least some of an exterior area of the vehicle 100A, 100B, 100C. The LIDAR sensor 130 may include a processor that is programmed to transmit LIDAR data via the vehicle 100A, 100B, 100C network. The LIDAR data may be received by the vehicle 100A, 100B, 100C computer 110 from LIDAR sensors 130 in a conventional manner, e.g., via a vehicle 100A, 100B, 100C network whereby the LIDAR data can be stored in a memory of the computer 110. The LIDAR data may be processed, e.g., a point cloud can be generated and analyzed in a conventional manner, to provide data including coordinates of objects, e.g., according to a 3-dimensional (3D) Cartesian coordinate system. A vehicle 100A, 100B, 100C may include a location sensor 130 such as a Global Positioning System (GPS) device, that provides respective locations data of each vehicle 100A, 100B, 100C, e.g., latitude and longitude coordinates.

Table 1 below illustrates a set of data that a sensor 130, 160 can provide about an object.

TABLE 1

| Datum | Description |
| --- | --- |
| Sensor identifier | An identifier of the source of object data, e.g., a specific sensor and/or the vehicle including the sensor. |
| Sensed object coordinates | 3D or 2D coordinates of a reference point in or on the object, e.g., vehicle reference point. |
| Orientation | Pitch, yaw, an or roll of the object. |
| Speed | Object's speed including a speed value and/or direction of movement. |
| Yaw rate | A rate of change of an object's yaw. |
| Classification | A type or category of object, e.g., pedestrian, car, |

TABLE 1-continued

| Datum | Description |
| --- | --- |
| | truck, bicycle, scooter, drone, stationary components, e.g., traffic sign. |
| Motion | Binary value specifying one of moving or stationary. |
| Time stamp | A time at which the object data was sensed, typically synchronized with a global time clock. |

In the present context, an "object" is any physical item detectable by a vehicle sensor, including, for example, (i) a pedestrian 190, (ii) a non-moving object 195, e.g., traffic sign, and/or (iii) a vehicle 100A, 100B, 100C. As seen in Table 1, "object data" received from a sensor 130, 160, e.g., a LIDAR sensor 130, may include one or more objects' sensed object coordinates, e.g., 3D or 2D coordinates, dimensions, speed, orientation, and/or sensor 130 identifier.

In the present context, the "sensed object coordinates" included in the object data are received from an object detection sensor 130, whereas "geo-coordinate data," i.e., geographic latitude and longitude pairs, is received from a location sensor 130 such as a GPS sensor 130. For example, LIDAR sensor 130 of the vehicle 100 may detect the vehicle 100B as an object within a detection range of the vehicle 100A LIDAR sensor 130. The vehicle 100A computer 110 may determine the sensed object coordinates of the vehicle 100B relative to the vehicle 100A based on the LIDAR sensor 130 data. Further, the vehicle 100A may determine its geo-coordinates based on vehicle 100A GPS sensor 130 data, and may determine the sensed object coordinates of the vehicle 100B relative to a global coordinate system, e.g., GPS coordinate system, based on the sensed object coordinates of the vehicle 100B relative to the vehicle 100A and the geo-coordinate data.

Further, the vehicle 100B computer 110 may determine vehicle 100B geo-coordinate data based on data received from a vehicle 100B location sensor 130. The computer 170 may (i) determine the sensed object coordinates of the vehicle 100B based on data received from the stationary sensor 160, (ii) receive, via a wireless communication network, geo-coordinate data of vehicle 100B, and/or (iii) receive object data from vehicle 100A including sensed object coordinates of the vehicle 100B detected as an object by the vehicle 100A object detection sensor 130.

A stationary sensor 160 may include a radar, camera sensor, and/or LIDAR device and provide object data from an area 180 that is covered by a detection range 175 of the stationary sensor 160. The stationary sensor 160 may be mounted to an infrastructure component, e.g., a building, a pole, etc. The stationary sensor 160 may include, and/or be mounted with and communicatively coupled to, a computer 170 that is programmed to communicate via a communication network with vehicles 100A, 100B, 100C, other stationary sensors 160, remote computers, etc. The computer 170 may be programmed to receive, e.g., object data, location data, route data, etc., from the vehicles 100A, 100B, 100C, and transmit data, e.g., an instruction to deactivate a suspicious vehicle 100A powertrain actuator 120, and to notify a remote computer about a cyber-attack on the suspicious vehicle 100A, etc., as discussed below with reference to FIGS. 4A-4B, 5 and 6A-6B.

In addition, the computer 110 may be programmed to communicate through a wireless communication network with, e.g., a remote computer. The wireless communication network, which may include a Vehicle-to-Vehicle (V2V) and/or a Vehicle-to-Infrastructure (V2X) communications, includes one or more structures by which the vehicles 100A, 100B, 100C, the stationary sensor 160, the remote computer, etc., may communicate with one another, including any suitable combination of wireless (e.g., cellular, wireless, satellite, microwave and radio frequency) communication mechanisms and any desired network topology (or topologies when a plurality of communication mechanisms are utilized). Exemplary V2V or V-to-I communication networks include cellular, Bluetooth, IEEE 802.11, dedicated short range communications (DSRC), and/or wide area networks (WAN), including the Internet, providing data communication services.

Figure 2:
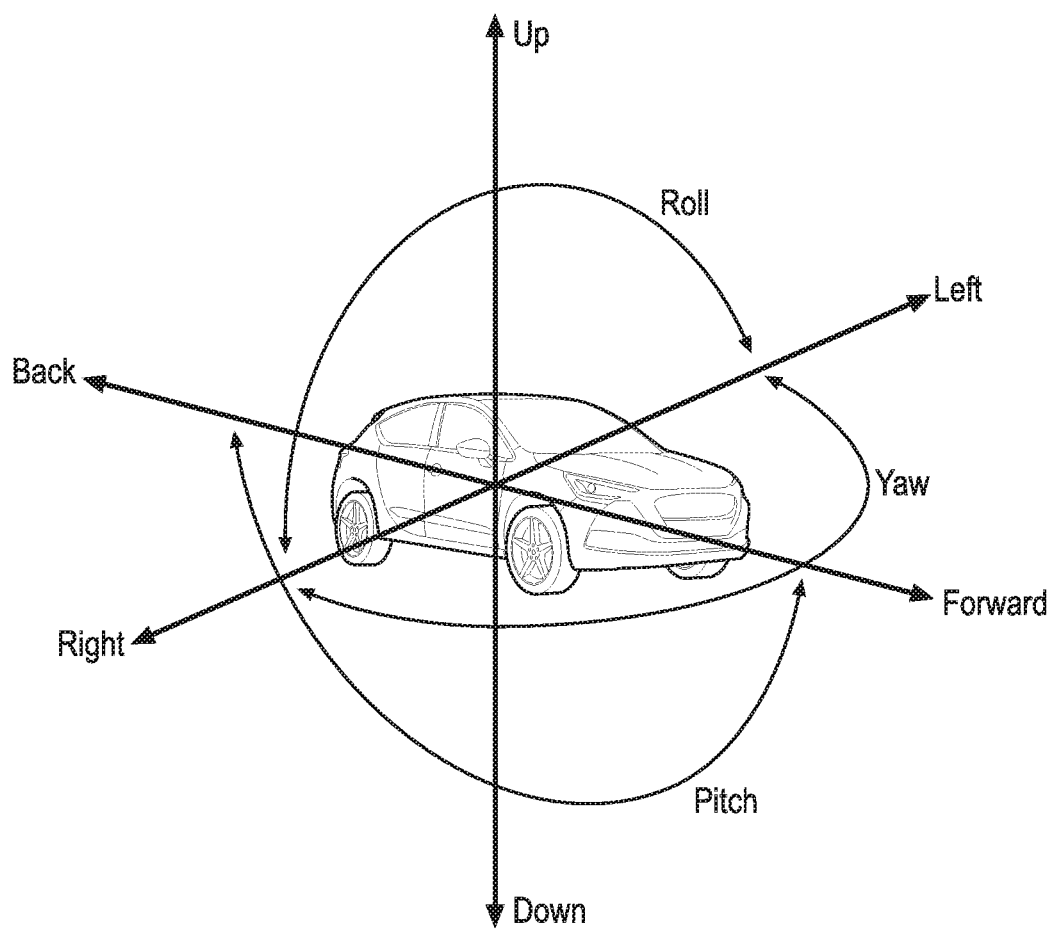
FIG. 2 is a perspective view of a vehicle with example orientation vectors superimposed thereon.

With reference to FIG. 2, an orientation of an object such as a vehicle 100A, 100B, 100C to a reference plane such as a ground level includes a scalar three-dimensional vector with a specified origin, e.g., at the vehicle 100 reference point 150, indicating a direction of the vehicle 100 relative to a reference 3D coordinates system, e.g., a Cartesian 3D coordinate system with an origin on the ground surface. For example, the orientation may include an algebraic sum, such as is known, of various independent vectors, each indicating a direction of the vehicle relative to a respective reference direction, e.g., a pitch, a yaw, and a roll of the vehicle 100A, 100B, 100C. Additionally or alternatively, the orientation may include a 3D vector including longitudinal, lateral, and vertical coordinates with reference to a 3D coordinates system.

A cyber-attack on a sensor 130 and/or a computer 110, etc., may result in altering or deleting of object data, which may impair an operation of one or more vehicles 100A, 100B, 100C. A stationary sensor 160 computer 170 can be programmed to receive respective object data, e.g., of vehicles 100A, 100B, 100C, pedestrian(s) 190, non-moving object(s) 195, including an object location from each of three or more vehicles 100A, 100B, 100C. Further, the computer 170 can be programmed to perform an action based on determining an inconsistency of the object data received from a first vehicle 100A with respect to respective object data of the other vehicles 100B, 100C.

The action may include at least one of (i) ignoring the object data received from the first vehicle, e.g., a second vehicle 100B computer 110 ignoring first vehicle object data at determining a vehicle 100B operation, (ii) actuating the first vehicle 100A to stop, e.g., actuating a first vehicle 100A braking actuator 120 to stop the first vehicle 100A, and/or (iii) outputting a message in an area 180 within a predetermined distance of the first vehicle 100A, e.g., broadcasting a message to vehicle 100A, 100B, 100C, and/or a remote computer, mobile devices of pedestrians 190, etc. including data (e.g., color, model, license plate number) pertaining to the first vehicle 100A.

In the present context, an "inconsistency" is at least one of (i) a failure to detect an object by a vehicle 100A, 100B, 100C that was detected by the stationary sensor 160 and/or other vehicle(s) 100A, 100B, 100C, e.g., when the first vehicle 100A fails to detect the vehicle 100B and the stationary sensor 160 detects the vehicle 100B within the detection range of the vehicle 100A sensor 130, (ii) detection of an object not included in the object data of the other vehicles, e.g., when the first vehicle 100A detect a non-existent object (or ghost object), and/or (iii) an object misclassification inconsistency. "Object misclassification inconsistency" occurs when an object classifier included in object data is incorrect, e.g., providing a truck classification for a pedestrian 190. Additionally or alternatively, inconsistency may include determining incorrect dimensions, motion status, speed, etc.

Object data generated by a vehicle 100A computer 110 may include (i) data from vehicle 100A sensors 130, e.g., object data describing vehicles 100B, 100C, pedestrian 190, non-moving object 195 based on vehicle 100A object detection sensor 130 data, and (ii) what is referred to as "ego object data," i.e., data provided by a vehicle 100A about itself, e.g., data that other vehicles 100B, 100C and/or sensors 160 might detect, such data including geo-coordinates from a vehicle 100A GPS sensor 130, and other data available to the computer 110 on a vehicle 100A network such as a CAN bus, e.g., vehicle 100A speed, yaw rate, as well as stored information in the computer 110, e.g., vehicle 100A dimensions.

As discussed above, a vehicle 100A, 100B, 100C object detection sensor 130 has a detection range, e.g., 200 meters from the vehicle 100 sensor 130 within a field of view of the sensor 130. However, a vehicle 100 sensor 130 may not be able to detect an object within the sensor 130 detection range due to an occlusion. In the present context, with reference to FIG. 3, an "occlusion" occurs when a second object, e.g., a vehicle 100E, is not visible to a viewer, e.g., a vehicle 100A sensor 130, because a first object, e.g., a vehicle 100D, blocks a viewing of the second object vehicle 100E. As another example (not shown), an object on a first road that crosses a second road where the vehicle 100A is located may be occluded for the vehicle 100A sensor 130 although being within the detection range of the sensor 130, due to a building object 195 at a corner of the intersection of first and second road that occludes the object.

Figure 3:
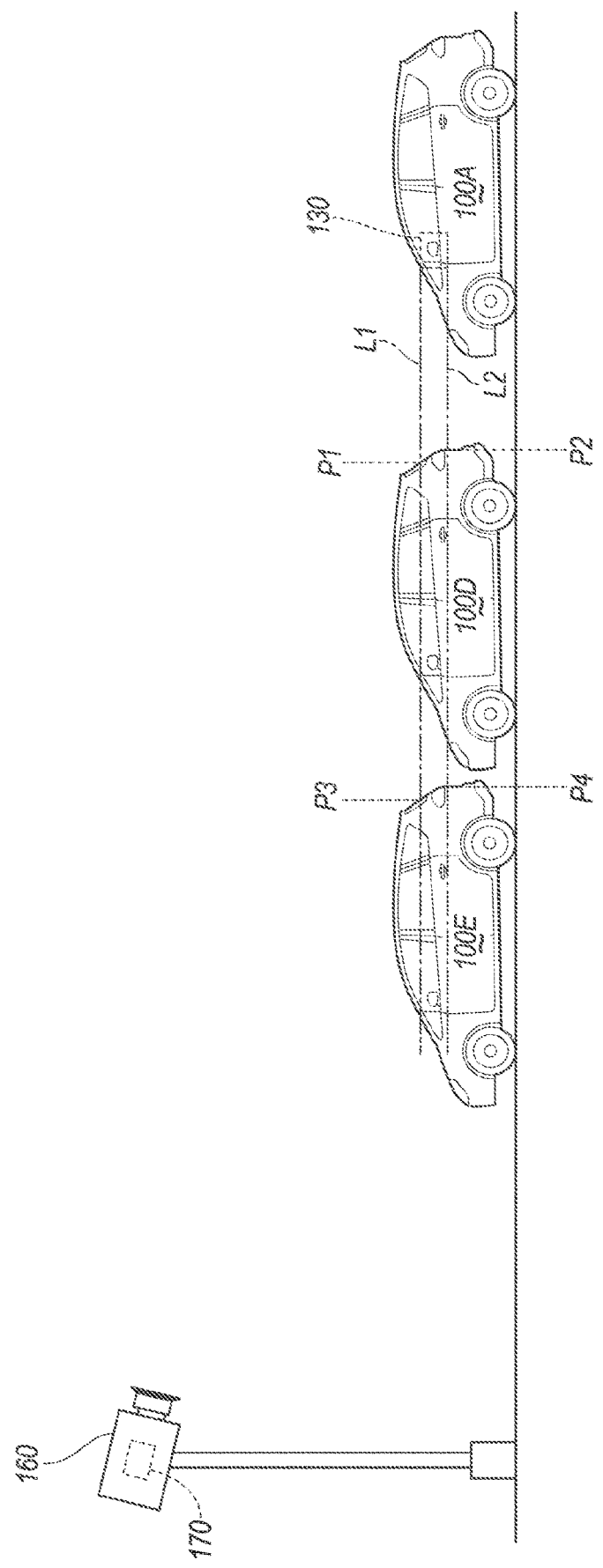
FIG. 3 shows an object that is occluded from a field of view of a vehicle sensor.

With reference to FIG. 3, the computer 170 may be programmed, based on determining that a second object 100D occludes the object 100E from a field of view of a first vehicle 100A sensor 130, to ignore the object 100E in determining the inconsistency of the object data of the first vehicle 100A. In other words, the computer 170 determines that a failure to detect the object 100E by the first vehicle 100A sensor 130 is consistent with determining that the object 100E is occluded and cannot be detected by the first vehicle 100A sensor 130.

In one example shown in FIG. 3, a stationary sensor 160 may be mounted on top of a pole, building, etc. The computer 170 may be programmed to determine based on object data received from the sensor 160 that the second object 100D occludes the object 100E from the field of view of the first vehicle 100A sensor 130. Additionally or alternatively, a computer 110 of a vehicle (not shown in FIG. 3) with a sensor 130 field of view including the vehicles 100A, 100D, 100E may be programmed to determine, based on the sensor 130 data, that the second object 100D occludes the object 100E from the field of view of the first vehicle 100A sensor 130.

In one example, the computer 170 may be programmed to determine perimeter points $P_3$, $P_4$ of the object 100E and to determine whether any point between the perimeter point $P_3$, $P_4$ is visible to the first vehicle 100 sensor 130. In the present context, "perimeter points" are points on a geometrical perimeter of an object 100E, as viewed by the first vehicle 100A sensor 130. In other words, the perimeter points $P_3$, $P_4$ are points on a perimeter of a projection of the object 100E on a projection plane, e.g., perpendicular to an imaginary line $L_1$, $L_2$ extending from the object 100E to the sensor 130. As shown in FIG. 3, any point of the object 100E between the perimeter points $P_3$, $P_4$ is occluded by a point of the object 100D between the projection points $P_1$, $P_2$. A projection point $P_1$, $P_2$ is an intersection point of (i) an outer surface of the object 100D and (ii) the imaginary lines $L_1$, $L_2$. The computer 170 may be programmed to determine that the object 100E is occluded upon determining that a line $L_1$, $L_2$ through any perimeter point $P_3$, $P_4$ of the object 100E intersects with a point $P_1$, $P_2$ of the object 100D. Additionally or alternatively, the computer 170 may be programmed using other techniques to determine that an object 100E is occluded by an object 100D from the field of view of the first vehicle 100A sensor 130.

The computer 170 may be programmed to determine the inconsistency of object data of the first vehicle 100A based at least in part on determining that the object is within a detection range 175 of the first vehicle 100A sensor 130, e.g., in a circular shaped range 175 with a diameter of 200 meters centered at the vehicle 100A reference point 150.

As discussed above, the computer 170 may be programmed to determine an inconsistency of the object data received, e.g., from a first vehicle 100A with respect to respective object data of the other vehicles 100B, 100C and/or stationary sensor 160. Various techniques may be utilized to detect an inconsistency in the object data. With reference to FIG. 4 an example technique is discussed.

Figure 4A:
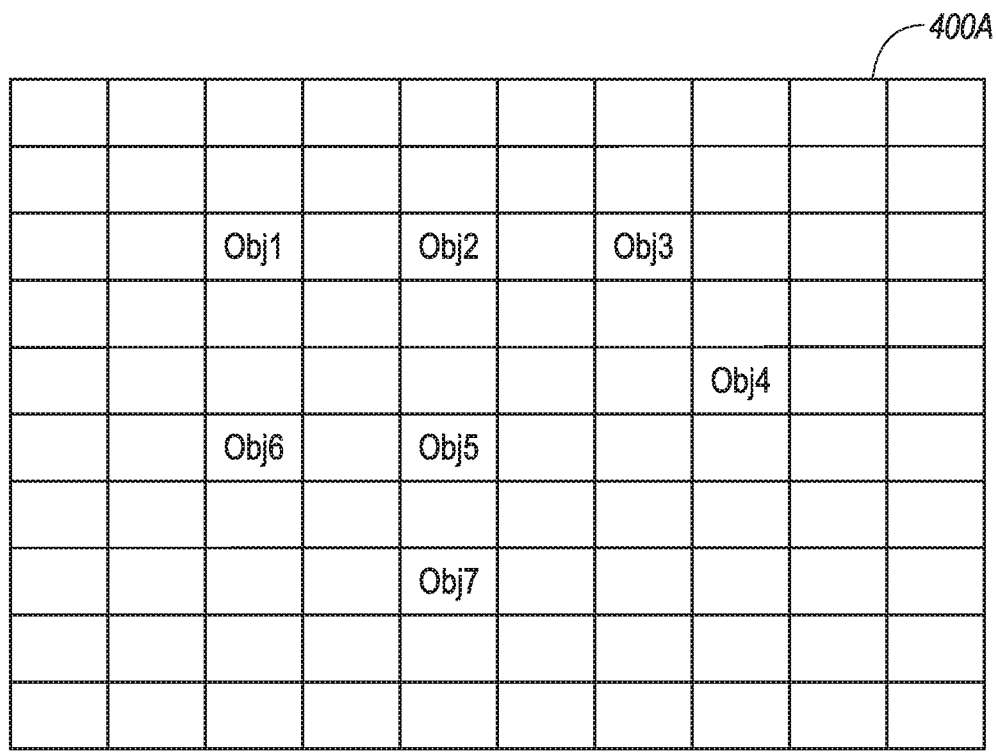
FIG. 4A shows an example occupancy grid map of objects within an area.

FIG. 4A shows an example occupancy grid map 400A of objects Obj1, . . . , Obj7 within an area 180. An occupancy map 400A, in the present context, is a map representing an area 180 in a 2D coordinate system, e.g., an area 180 specified around the location of the stationary sensor 160. Each cell corresponds to a location that is specified with respect to a coordinate system, e.g., a Cartesian coordinate system such as a GPS geo-coordinate system. A cell may be identified with a grid index x, y with respect to an origin of the grid map 400A, e.g., a center point of the grid map 400A, a global origin of GPS coordinate system, etc. "Occupied," in the present context, means that at least a portion of a volume above an area of a respective cell on the ground surface is occupied by a physical object Obj1, Obj7, e.g., an object 195, a pedestrian 190, a vehicle 100A, 100B, 100C, a pole of the stationary sensor 160, etc. Cells of a grid map 400A may have specified dimensions, e.g., 20×20 centimeter. In one example, the grid map 400A shows an occupied cell for an object at a reference location, e.g., vehicle 100A reference point 150. Additionally or alternatively, an occupancy map 400A may be a 3D occupancy map 400A which additionally shows an elevation of the object Obj1, . . . , Obj7 from the ground surface.

The computer 170 may be programmed to generate a grid map 400A for the area 180 covered by the grid map 400A based on received object data from the vehicles 100A, 100B, 100C, stationary sensor 160, etc. The computer 170 may be programmed to identify an object Obj1, . . . , Obj7 in the grid map 400A upon determining that at least one vehicle 100A, 100B, 100C, stationary sensor 160, etc. has identified the respective object. In other words, all object data from all sensors 130, 160. As discussed above, a vehicles 100A, 100B, 100C may include a GPS sensor 130 and may transmit geo-coordinate data via the wireless communication network. In one example, the computer 170 may be programmed to identify the vehicles 100A, 100B, 100C in the grid map 400A further based on the geo-coordinate data of a vehicle 100A, 100B, 100C. The grid map 400A may be stored in a computer 170 memory in a table or the like, e.g., as illustrated by Table 2. The data for unoccupied cells may be left blank (or set to NULL). Table 2 shows an example of 3D grid map. A 2D grid map 400A omits height or elevation data, i.e., in the below example, the elevation z.

TABLE 2

| Cell data item | Description |
| --- | --- |
| x | Longitudinal coordinate with respect to an origin, e.g., a GPS reference point. |
| y | Lateral coordinate with respect to an origin, e.g., a GPS reference point. |
| z | Elevation coordinate with respect to an origin, e.g., a GPS reference point. |
| Classifier | Majority vote for classifier. |
| Dimensions | Dimension values based on an average of majority object data. |
| Speed | Speed based on an average of majority object data. |
| Orientation | Orientation based on an average of majority object data. |

The computer 170 may be then programmed to determine an inconsistency in the object data of a vehicle 100A, 100B, 100C based on a comparison of respective vehicle 100A, 100B, 100C data that is referred to as a voting technique. In the present context, in the voting technique, the computer 170 determines ground truth including object data such as location, classifier, dimensions, etc., based on a majority voting technique, e.g., an object classification in the ground truth data is what a majority of respective object data specifies. An inconsistency can then be determined based on deviations from the ground truth. For example, upon determining that object data from a majority, e.g., 3, of sources, e.g., vehicles 100B, 100C sensors 130 and the stationary sensor 160, identified a pedestrian 190 at a cell location x, y and a minority, e.g., 1, of source(s), e.g., the vehicle 100A sensor 130, determined a truck at the grid index x, y, the computer 170 determines that the object Obj7 at the location x, y has a pedestrian classifier, which is the ground truth. Additionally or alternatively, upon determining that a majority of sources identified no object at a grid index x, y, whereas a minority of sources determined an object at the respective grid index, the computer 110 may be programmed to determine a ghost object (non-existent object) at the grid index x, y.

In the present context, "majority" may be a simple majority, i.e., over 50%, but may a specified threshold, e.g., 60%. The computer 110 may be programmed to adjust the threshold based on various factors, e.g., a weather condition, a confidence of the source of object data, etc. For example, an object detection sensor 130, 160 may, in addition to object's sensed object coordinates, etc., generate a confidence value. The computer 110 may be programmed to take into account the confidence values when determining a majority threshold. For example, with reference to equation (1), the computer 170 may be programmed to apply a weight $w_i$ to object data, e.g., a parameter $P_i$ such as speed, dimensions, yaw rate, etc., based on respective confidence value of the object data source and to determine the majority based on weighted object data P. In one example, a weight w 1 is a number between 0 (zero) and 1 corresponding to a confidence value provided by the respective source, e.g., vehicle 100A, 100B, 100C sensor 130. Thus, the computer 170 may be programmed to determine that ground truth value based on received values $P_i \ldots P_n$ from n sensors 130 is P.

$$P = \frac{\sum_{i=1}^{n} w_i P_i}{\sum_{i=1}^{n} w_i}$$

Figure 4B:
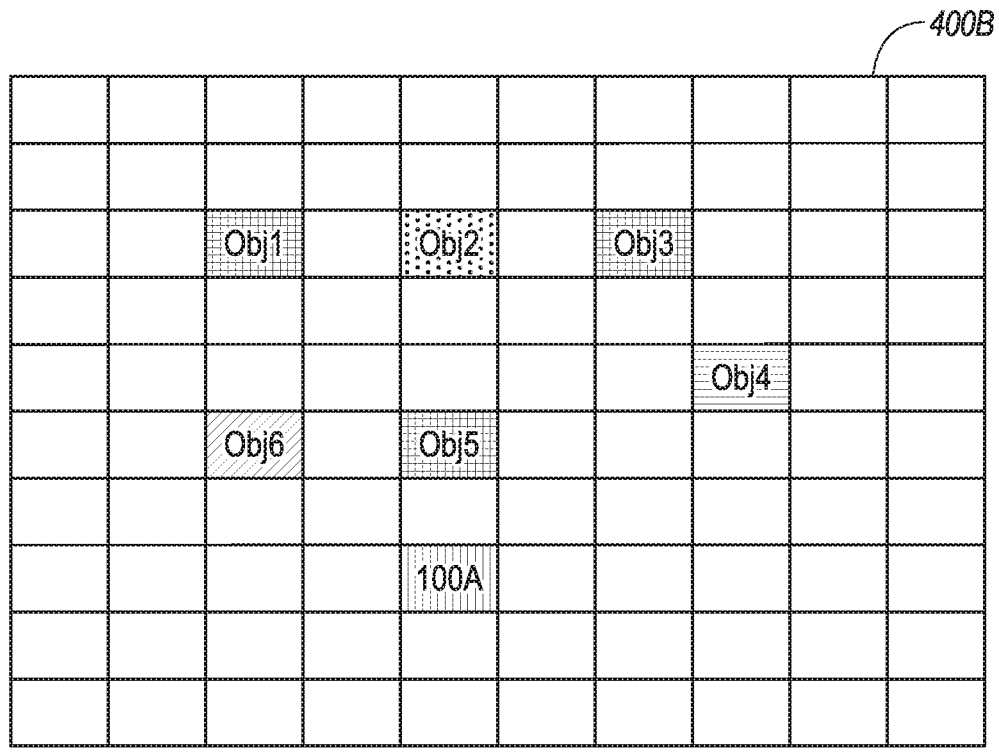
FIG. 4B shows the grid map of FIG. 4A with respect to object data received from a first vehicle.

The computer 170 may be programmed to determine an inconsistency based on the generated grid map 400A and object data associated with each of the vehicles 100A, 100B, 100C and the stationary sensor 160. The computer 170 may be programmed to generate a plurality of second grid maps 400B, each grid map 400B including at least a portion of the grid map 400A that is within the detection range of one of the vehicles 100A, 100B, 100C. With reference to FIG. 4B, the computer 170 may be programmed to generate the second grid map 400B for the vehicle 100A. In other words, the grid map 400B illustrates a graphical interpretation of inconsistencies and/or lack of inconsistencies (i.e., matching data) in vehicle 100A object data in comparison to the grid map 400A.

As shown in FIG. 4B, the computer 170 may be programmed to determine that the Obj7 is same as the vehicle 100A, e.g., based on geo-coordinate data from the vehicle 100A GPS sensor 130. The computer 170 may be programmed to determine, as discussed above, that the object Obj2 is occluded by an object Obj5. The computer 170 may be programmed to determine that the vehicle 100A correctly detects the objects Obj1, Obj3, Obj5. In one example, the computer 170 may be programmed to determine that the objects Obj1, Obj3, Obj5 are correctly detected upon determining that the object data received from the vehicle 100A at least partially matches the majority vote object data for the respective cell (see Table 2). For example, the computer 170 may be programmed to determine that the object Obj1 is correctly detected by the vehicle 100A, upon determining that the sensed object coordinates of the Obj1 based on the majority vote, and the sensed object coordinates based on the object data received from the vehicle 100A, match. In the present context, "matching" means having a same grid index x, y, or a distance between the grid cells being less than a predetermined distance, e.g., 2 meters. Additionally, with respect to Table 2, "matching" may mean that at least one of dimensions, speed, yaw rate, orientation, etc., of the Obj1 based on the object data from the vehicle 100A match the majority vote. For example, the computer 170 may be programmed to determine an inconsistency when a determined orientation of an object differs more than 10% from the orientation determined as the ground truth, although the location of the object was detected correctly.

In yet another example, the computer 170 may be programmed to determine that the objects Obj1, Obj3, Obj5 are correctly detected by the vehicle 100A, upon determining that each of the objects Obj1, Obj3, Obj5 are within a predetermined distance threshold, e.g., 2 meters, from an object detected by the stationary sensor 160. Additionally, the computer 170 may be programmed to determine that the objects Obj1, Obj3, Obj5 are correctly detected upon determining that at least one of a classifier, dimensions, speed, yaw rate, orientation, etc., of the Obj1 based on the object data from the vehicle 100A match the object data generated by the stationary sensor 160 for the respective object Obj1. In the present context, a speed, orientation, etc. value "matches" when a deviation from the ground truth value, e.g., from the stationary sensor 160 or the grid map 400A, does not exceed a specified threshold, e.g., 10%. In one example, the threshold(s) may be defined based on an effect of deviation on a likelihood of a collision. For example, a deviation in object dimensions may less likely result in a collision, however, a deviation of determined yaw rate from ground truth may more likely result in a collision. A yaw rate is related to changing lane or a turning maneuver. Thus, in one example, "matching" for yaw rate may mean having a deviation less than 5%, whereas "matching" for dimensions may mean having a deviation less than 20%.

The computer 170 may be programmed to identify an object Obj4 that the vehicle 100A failed to detect upon determining that the stationary sensor 160 detected the object Obj4 and/or the object Obj6 occupies the respective grid based on majority vote, as discussed above. Additionally or alternatively, the computer 170 may be programmed to determine that the vehicle 100A sensor 130 failed to detect the object Obj4, upon determining that a classifier of the object Obj6 and/or other object data, e.g., speed, etc., based on the object data received from the vehicle 100A do not match the grid map 400A data for the respective cell.

As discussed above, the "inconsistency" is at least one of (i) a failure to detect an object, e.g., when the first vehicle 100A fails to detect the vehicle 100B, (ii) detection of an object not included in the object data of the other vehicles, e.g., when the first vehicle 100A detect a non-existent object (or ghost object), and/or (iii) an object misclassification. Table 3 shows an example set of parameters determined by the computer 170 in order to determine whether object data includes an inconsistency, as discussed below with reference to equations (2)-(3).

TABLE 3

| Parameter | Description |
|---|---|
| $N_i$ | Total number of object(s) within detection range of $i^{th}$ vehicle, e.g., the first vehicle 100A. |
| $N_v(i)$ | Total number of object(s) within detection range of $i^{th}$ vehicle that are visible to the $i^{th}$ vehicle. |
| $N_{oc}(i)$ | Total number of object(s) within detection range of $i^{th}$ vehicle that are occluded from the $i^{th}$ vehicle. |
| $N_{gh}(i)$ | Total number of ghost object(s) detected by the $i^{th}$ vehicle. |
| $N_c(i)$ | Number of object(s) correctly detected by $i^{th}$ vehicle. |
| W | Inconsistency threshold weight, e.g., 0.5 |
| S | Status of $i^{th}$ vehicle, binary value specifying "Consistent" or "Inconsistent." |

In one example, the computer 170 may be programmed to determine an inconsistency of object data from, e.g., the vehicle 100A, based on the equations (2)-(3) and Table 3. The computer 170 may be programmed to determine a status S of an $i^{th}$ vehicle based on a number of objects correctly detected $N_c(i)$, the number of objects visible to the of $i^{th}$ vehicle $N_v(i)$. The computer 170 may be programmed to determine the number of objects correctly detected by of $i^{th}$ vehicle Nc(i) based on number of objects from the grid map 400A that match the object data received from the $i^{th}$ vehicle, e.g., 3 for Obj1, Obj3, Obj5.

$$N_v(i) = N_i - N_{oc}(i) \quad (2)$$

$$S = \begin{cases} \text{Consistent} & N_c(i) \geq w.N_v(i) \\ \text{Inconsistent} & N_c(i) < w.N_v(i) \end{cases} \quad (3)$$

Additionally or alternatively, the computer 170 may be programmed to determine an inconsistency (i.e., a status S being "Inconsistent") further based on a number of non-existent ghost objects $N_{og}$. In one example, the computer 170 may be programmed to determine a number of objects correctly detected by of $i^{th}$ vehicle Nc(i) by subtracting the number of ghost objects $N_{og}$ from the number of objects detected by the $i^{th}$ vehicle matching the grid map 400A. For example, with reference to grid map 400B, the computer 170 may be programmed to determine 3 objects Obj1, Obj3, Obj5 correctly detected and a ghost object Obj6. Thus, the computer 170 may determine Nc(i) to be 2 for the vehicle 100A.

An operation of a sensor 130, 160 may be subject to temporary impairment of operation that results in an inconsistency in sensor 130 operation. The computer 170 may be programmed to determine an inconsistency upon determining that a status S of object data from a sensor 130 is inconsistent for a time duration exceeding a specified threshold, e.g., 2 seconds. In other words, the computer 170 may be programmed to ignore an inconsistency in sensor 130 object data when a duration of receiving inconsistent object data from the sensor 130 is less than the time threshold and only performs an action in response to the inconsistency when a time duration of inconsistency exceeds a time threshold.

Figure 5:
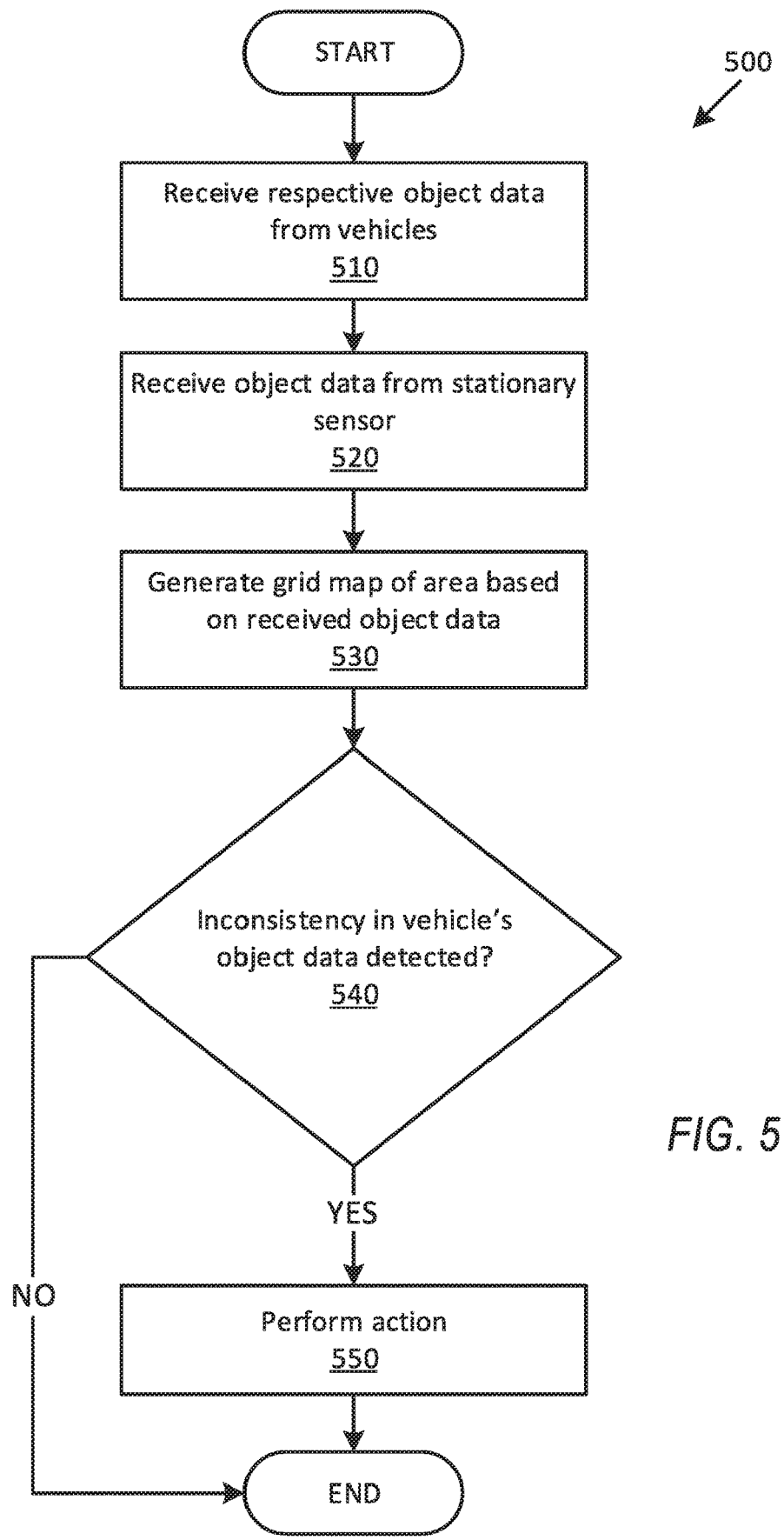
FIG. 5 is a flowchart of an exemplary process for identifying inconsistency in object data of vehicles.

FIG. 5 shows an example process 500 for identifying a suspicious vehicle 100A, 100B, 100C. For example, the computer 170 may be programmed to execute blocks of the process 500. Additionally or alternatively, a vehicle 100A, 100B, 100C computer 110 may be programmed to execute blocks of the process 500.

The process 500 begins in a block 510, in which the computer 170 receives respective object data from the vehicles 100A, 100B, 100C. The computer 110 may be programmed to receive the object data, e.g., as illustrated in Table 1, via a wireless communication network.

Next, in a block 520, the computer 170 receives object data from the stationary sensor 160, e.g., via a communications bus or the like and/or a wired and/or wireless communication network.

Next, in a block 530, the computer 170 generates grid map 400A of an area 180 including a sensor 160 location. The grid map 400A may include location (grid index x, y) of objects reference points, e.g., vehicle 100A, 100B, 100C reference point 150, classifier, speed, yaw rate, etc. (see Table 2). The grid map 400A may be 2D or 3D. The computer 170 may be programmed to generate the grid map 400A data based on, e.g., a voting technique, as discussed above.

Next, in a decision block 540, the computer 170 determines whether there is an inconsistency in vehicle 100A, 100B, 100C object data. In one example, the computer 170 may be programmed to determine that a vehicle 100A, 100B, 100C object data has an inconsistency (i.e., a status S is "inconsistent") based on equations (2)-(3). If the computer 170 determines an inconsistency in a vehicle 100A, 100B, 100C object data (i.e., vehicle 100A, 100B, 100C being suspicious), then the process 500 proceeds to a block 550; otherwise the process 500 ends, or alternatively returns to the block 510, although not shown in FIG. 5.

In the block 550, the computer 170 performs an action. The computer 170 may be programmed to send a message including an identifier, location coordinates, classification, orientation, etc. of the suspicious vehicle 100A, 100B, 100C to a remote computer, e.g., to police or other authorities. Additionally or alternatively, the computer 110 may be programmed to instruct other (non-suspicious) vehicles 100A, 100B, 100C to avoid a suspicious vehicle 100A, 100B, 100C, e.g., by updating the route to keep a minimum distance from the suspicious vehicle 100A, 100B, 100C.

Following the block 550, the process 500 ends, or alternatively returns to the block 510, although not shown in FIG. 5.

FIG. 6 shows an example process 600 for operating a vehicle 100A, 100B, 100C. A vehicle 100A, 100B, 100C computer 110 may be programmed to execute blocks of the process 600.

Figure 6A:
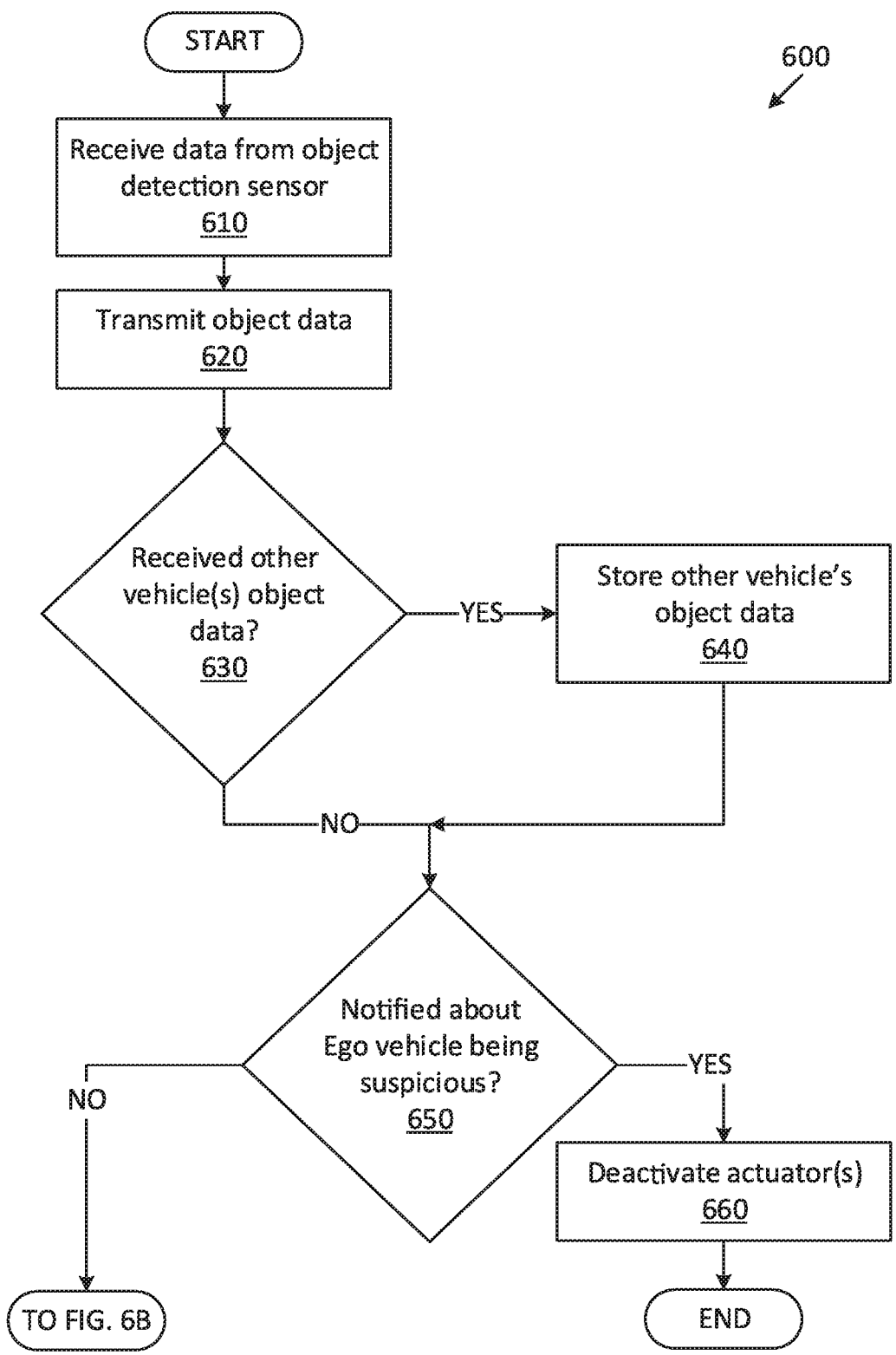
FIGS. 6A-6B are a flowchart of an exemplary process for operating the vehicle.

With reference to FIG. 6A, the process 600 begins in a block 610, in which the computer 110 receives data from object detection sensor(s) 130. The computer 110 may be programmed to receive data from one or more LIDAR sensor(s) 130, radar sensor 130, camera sensor 130, GPS sensor 130, etc., and to generate object data such as example shown in Table 1. The object data may also include the ego object data of the vehicle 100A, 100B, 100C, based on known geo-coordinate, speed, yaw rate, etc.

Next, in a block 620, the computer 110 transmits the generated object data. For example, the computer 110 may be programmed to transmit the generated object data via a wireless communication network.

Next, in a decision block 630, the computer 110 determines whether object data is received from other vehicles 100A, 100B, 100C. The computer 110 may be programmed to receive object data via a wireless communication network. If the computer 110 receives object data from other vehicles 100A, 100B,100C, the process 600 proceeds to a block 640; otherwise the process 600 proceeds to a decision block 650.

In the block 640, the computer 110 stores the received object data of other vehicles 100A, 100B, 100C. As discussed below, the computer 110 may navigate the vehicle 100A, 100B, 100C in part based on the object data of other vehicles 100A, 100B, 100C.

In the decision block 650, the computer 110 determines whether being notified about being a suspicious vehicle 100A, 100B, 100C. For example, the computer 110 may be programmed to receive a notification of a suspicious vehicle 100A, 100B, 100C. If the computer 110 is notified that the ego vehicle 100A, 100B, 100C is suspicious, then the process 600 proceeds to a block 660; otherwise the process 600 proceeds to a decision block 670 (see FIG. 6B).

In the block 660, the computer 110 deactivates one or more vehicle 100A, 100B, 100C actuators 120. For example, the computer 110 may be programmed, based on the received notification, to deactivate a powertrain actuator 120. Additionally or alternatively, the computer 110 may be programmed to activate a brake actuator 120 to stop the vehicle 100A, 100B, 100C, and/or to exit a road, e.g., by stopping at a shoulder of the road. Following the block 660, the process 600 ends, or alternatively returns to the block 610, although not shown in FIG. 6A.

Figure 6B:
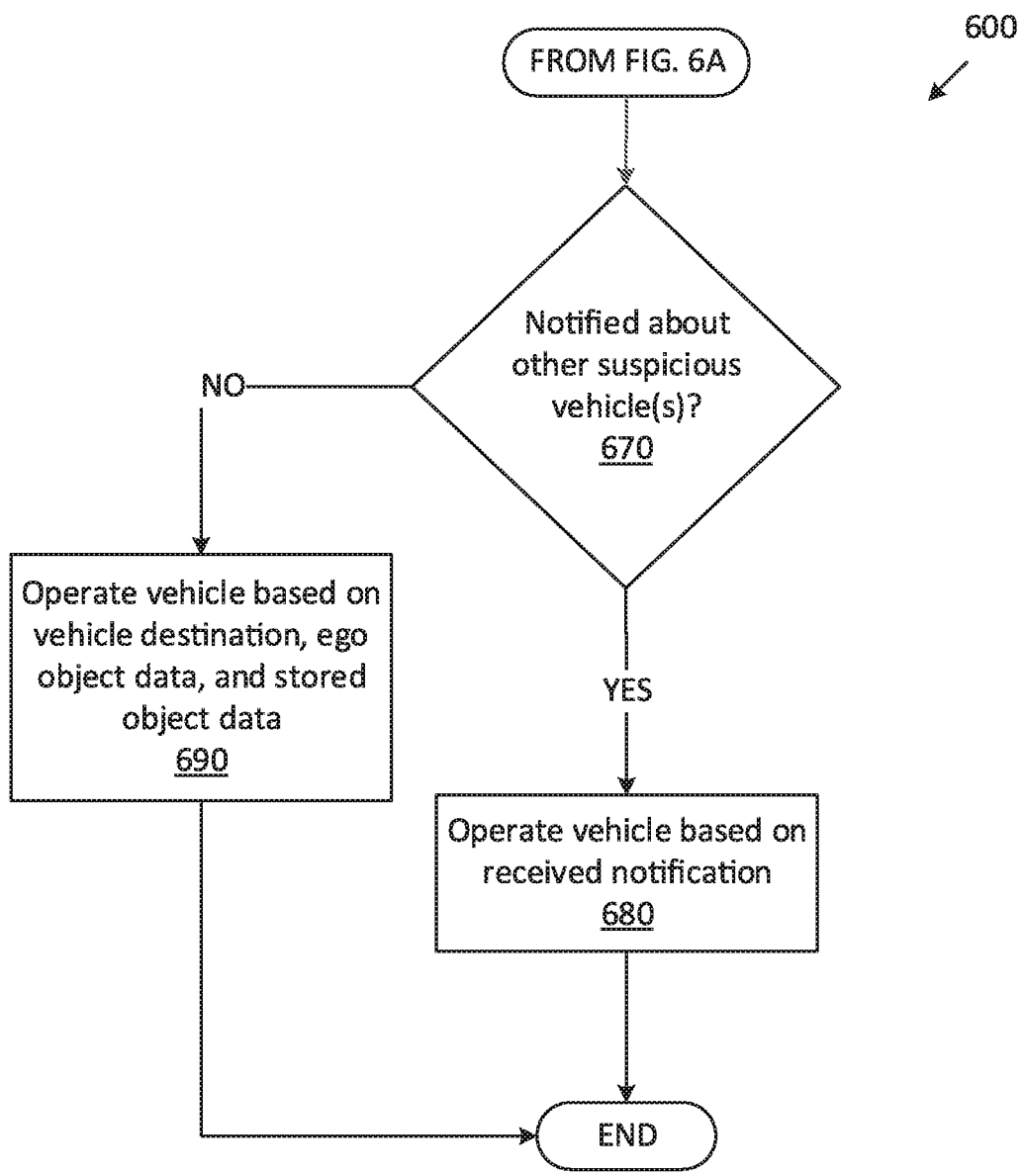

Now turning to FIG. 6B, in the decision block 670, the computer 110 determines whether it has been notified about other suspicious vehicles 100A, 100B, 100C. The computer 110 may be programmed to receive data including sensed object coordinates, classifier, speed, etc. of the suspicious vehicle 100A, 100B, 100C. Additionally, the computer 110 may be programmed to receive instructions about an expected reaction (e.g., new route, exit road, etc.) to the suspicious vehicle 100A, 100B, 100C. If the computer 110 receives notification of other suspicious vehicle 100A, 100B, 100C, the process 600 proceeds to a block 680; otherwise the process 600 proceeds to a block 690.

In the block 680, the computer 110 operates the vehicle 100A, 100B, 100C based on the received notification. In one example, the computer 110 may be programmed to update a vehicle 100A, 100B, 100C route based on the received sensed object coordinates, speed, orientation, etc. of the suspicious vehicle 100A, 100B, 100C. Additionally or alternatively, the computer 110 may be programmed to operate the vehicle 100A, 100B, 100C based on received instructions, e.g., to stop, to exit the road, to navigate based on a received route. Following the block 680, the process 600 ends, or alternatively returns to the block 610, although not shown in FIG. 6B.

In the block 690, the computer 110 operates the vehicle 100A, 100B, 100C based on data received from its own object detection sensors 130, the stored object data (received from other vehicles 100A, 100B, 100C), and the vehicle 100A, 100B, 100C destination, e.g., inputted via the HMI 140. The computer 110 may be programmed to fuse the ego object data and the stored object data using sensor fusion techniques, e.g., Kalman filter, Bayesian networks, and to operate the vehicle 100A, 100B, 100C based on the results of sensor fusion and vehicle route data. Following the block 690, the process 600 ends, or alternatively returns to the block 610, although not shown in FIG. 6B.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A computer, comprising a processor and a memory, the memory storing instructions executable by the processor to:
    receive object data from each of three or more vehicles, wherein the object data from each of the three or more vehicles includes an object location;
    determine an inconsistency of the object data received from a first vehicle of the three or more vehicles based on a comparison of the object data received from the first vehicle with the object data from at least a second vehicle and a third vehicle of the three or more vehicles; and
    based on determining the inconsistency of the object data received from the first vehicle, perform an action,
    wherein the action includes at least one of ignoring the object data received from the first vehicle; actuating the first vehicle to stop; or outputting a message in an area within a predetermined distance of the first vehicle.

2. The computer of claim 1, wherein the object data in addition to the object location further includes at least one of an object orientation, object dimensions, a sensor identifier, and a time stamp.

3. The computer of claim 1, wherein the inconsistency includes a failure to detect an object, detection of an object not included in the object data of the other vehicles, or an object misclassification.

4. The computer of claim 3, wherein the object data further includes an object classifier including at least one of a car, a truck, a pedestrian, and a bicycle, and an object misclassification inconsistency includes an incorrect object classifier included in object data.

5. The computer of claim 1, wherein the object data further includes a motion status specifying at least one of a moving object and a stationary object.

6. The computer of claim 1, wherein the object location in the first vehicle's object data is a location of the first vehicle.

7. The computer of claim 1, wherein the instructions further include instructions to, based on determining that a second object occludes the object from a field of view of a first vehicle sensor, ignore the object in determining the inconsistency of the object data of the first vehicle.

8. The computer of claim 7, wherein the instructions further include instructions to determine, based on object data received from a second sensor, that the second object occludes the object from the field of view of the first vehicle sensor, wherein the second sensor is at least one of a second vehicle sensor and a stationary sensor mounted to an infrastructure component.

9. The computer of claim 1, wherein the instructions further include instructions to determine the inconsistency of the object data of the first vehicle further based on determining that the object is within a detection range of the first vehicle.

10. The computer of claim 1, wherein the instructions cause the processor to:
    determine the inconsistency of the object data according to $N_v(i)=N_t-N_{oc}(i)$, wherein $N_v(i)$ represents a number of object within detection range of an $i^{th}$ vehicle that are visible to the $i^{th}$ vehicle, $N_t$ represents a total number of objects within the detection range of the $i^{th}$ vehicle, and $N_{oc}(i)$ represents a total number of object within the detection range of the $i^{th}$ vehicle that are occluded from the $i^{th}$ vehicle.

11. A method, comprising:
    receiving object data from each of three or more vehicles, wherein the object data from each of the three or more vehicles includes an object location;
    determining an inconsistency of the object data received from a first vehicle of the three or more vehicles based on a comparison of the object data received from the first vehicle with the object data from at least a second vehicle and a third vehicle of the three or more vehicles; and
    based on determining the inconsistency of the object data received from the first vehicle, performing an action,
    wherein the action includes at least one of ignoring the object data received from the first vehicle; actuating the first vehicle to stop; or outputting a message in an area within a predetermined distance of the first vehicle.

12. The method of claim 11, wherein the object data in addition to the object location further includes at least one of an object orientation, object dimensions, a sensor identifier, and a time stamp.

13. The method of claim 11, wherein the inconsistency includes a failure to detect an object, detection of an object not included in the object data of the other vehicles, or an object misclassification.

14. The method of claim 11, wherein the object data further includes an object classifier including at least one of a car, a truck, a pedestrian, and a bicycle, and an object misclassification inconsistency includes an incorrect object classifier included in object data.

15. The method of claim 11, wherein the object data further includes a motion status specifying at least one of a moving object and a stationary object.

16. The method of claim 11, wherein the object location in the first vehicle's object data is a location of the first vehicle.

17. The method of claim 11, further comprising, based on determining that a second object occludes the object from a field of view of a first vehicle sensor, ignoring the object in determining the inconsistency of the object data of the first vehicle.

18. The method of claim 17, further comprising determining, based on object data received from a second sensor, that the second object occludes the object from the field of view of the first vehicle sensor, wherein the second sensor is at least one of a second vehicle sensor and a stationary sensor mounted to an infrastructure component.

19. The method of claim 11, further comprising determining the inconsistency of the object data of the first vehicle further based on determining that the object is within a detection range of the first vehicle.

20. The method of claim 11, further comprising:
    determining the inconsistency of the object data according to $N_v(i)=N_t-N_{oc}(i)$, wherein $N_v(i)$ represents a number of object within detection range of an $i^{th}$ vehicle that are visible to the $i^{th}$ vehicle, $N_t$ represents a total number of objects within the detection range of the $i^{th}$ vehicle, and $N_{oc}(i)$ represents a total number of object within the detection range of the $i^{th}$ vehicle that are occluded from the $i^{th}$ vehicle.

\* \* \* \* \*